April 4, 1939.  A. E. COYNE  2,152,955
ELECTRICALLY MAINTAINED VIBRATING BODY AND SYSTEM EMBODYING SAME
Filed Dec. 27, 1937  4 Sheets-Sheet 1
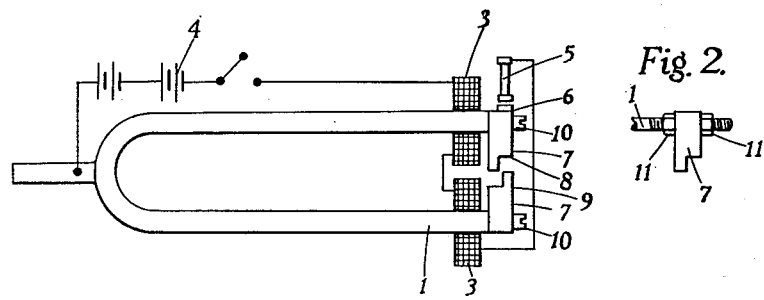
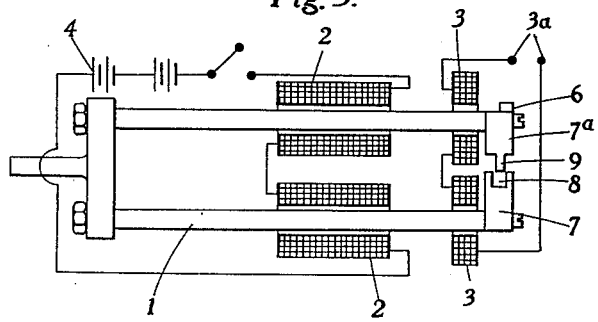
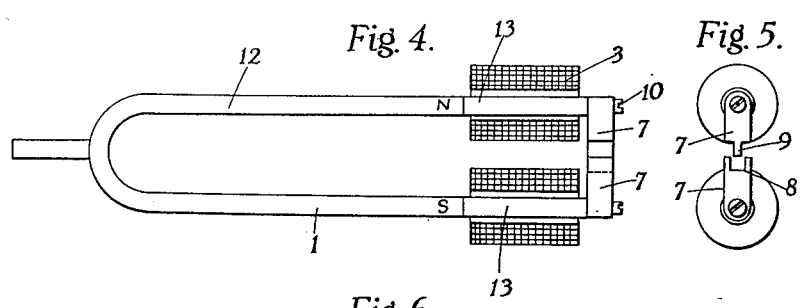
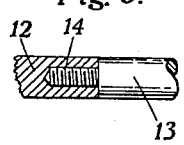
INVENTOR
Albert Edward Coyne
BY
Ralph O. Stewart
ATTORNEY April 4, 1939.	A. E. COYNE	2,152,955
ELECTRICALLY MAINTAINED VIBRATING BODY AND SYSTEM EMBODYING SAME
Filed Dec. 27, 1937	4 Sheets-Sheet 2
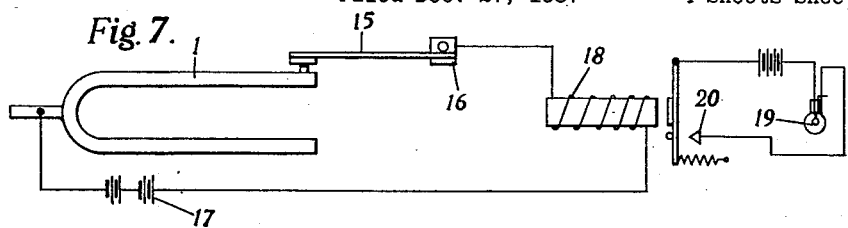
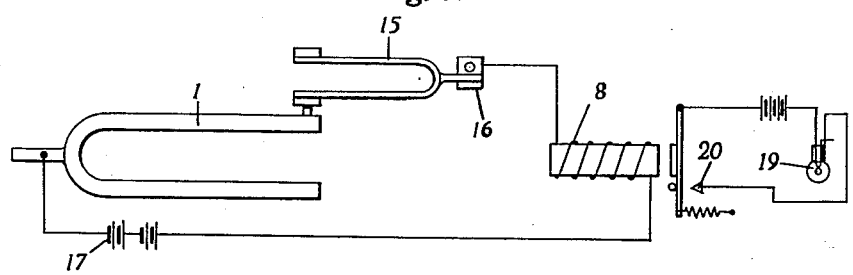
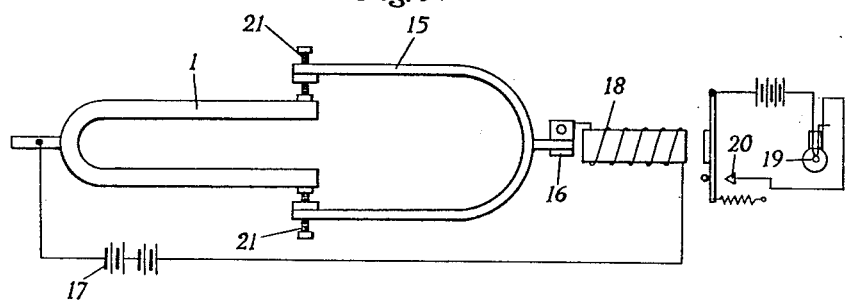
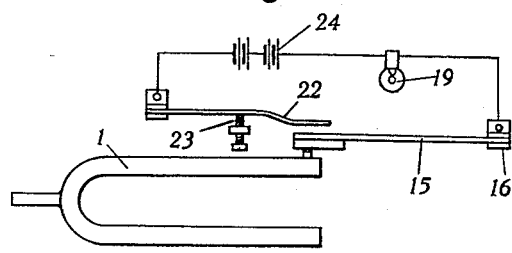
INVENTOR
Albert Edward Coyne
BY
Ralph B. Stewart
ATTORNEY INVENTOR
Albert Edward Coyne
BY Ralph B. Stewart
ATTORNEY Patented Apr. 4, 1939

2,152,955

UNITED STATES PATENT OFFICE 2,152,955

ELECTRICALLY MAINTAINED VIBRATING BODY AND SYSTEM EMBODYING SAME

Albert Edward Coyne, Goodwood, Cape Province, Union of South Africa

Application December 27, 1937, Serial No. 181,945
In Great Britain January 8, 1937

17 Claims. (Cl. 35—1)

This invention relates to systems in which mechanically vibrating bodies such as tuning forks or reeds are utilised, and to arrangements for maintaining such bodies in vibration electrically.

The usual arrangement of an electrically maintained tuning fork comprises an intermittently energised electro-magnet placed in proximity to the limbs of the tuning fork in such a way that the fork is kept vibrating by the intermittent attraction of the said magnet. In such arrangements there is a liability for unequal magnetic attraction to take place due to slight difference in the clearances between the poles of the electro-magnet and the limbs of the fork, so that if the excitation is excessive, the result may be that one of the limbs of the fork beats against the core of the electro-magnet unless very large clearance is provided, or again, the whole fork may be deflected bodily so as possibly to set up a vibration of the frequency different from the fundamental frequency and independent of the fundamental frequency of the fork or its harmonics.

One primary purpose of the present invention, therefore, is to enable an electrically maintained vibrating body to be operated with less liability to disturbance than in prior arrangements, and to enable the forces actuating such a tuning fork or other vibratory body to be entirely balanced mechanically.

Thus, the invention consists in making a tuning fork or reed in such a way that the magnetic circuit of the operating flux is contained in the tuning fork itself, and the winding which gives rise to the vibrations surrounds one or both limbs of the fork instead of being carried on an external electro-magnet. Therefore the magnetic circuit of the arrangement is contained within the fork itself and its pole pieces if the latter are not actually integral with the fork, and no magnetic member external to the fork is provided through which the operating flux has to pass. The windings may be wound on the limbs of the fork, or may consist of coils wound on rigid formers with sufficient clearance to avoid interference with the free vibration of the limbs of the fork. In addition to the operating winding carrying fluctuating current, polarising windings carrying steady current may be linked with the limbs of the tuning fork, or the polarising flux may be provided by a permanent magnet and the coils carrying the fluctuating current may be located around soft iron extensions of that permanent magnet.

The fork may either be bent round to form pole pieces or may be fitted with separate pole pieces, and to enable the magnetic circuit to be nearly closed without interfering with the vibration of the ends of the fork, the pole pieces are conveniently made to overlap or to interleave so that during the vibration they do not come into contact and yet enable a small air gap to be provided when at rest.

The fluctuating current in the actuating windings may be supplied in any convenient way. Thus, these windings may be in circuit with a source of direct current, the circuit also passing through contacts controlled by the vibrations. Such an arrangement is suitable for a self-maintaining tuning fork. In other cases, the actuating windings may be supplied from an amplifier which is convenient when it is desired for the tuning forks to respond to voice currents which may be obtained from a microphone feeding the said amplifier.

The invention also provides a method of controlling signalling circuits by causing a tuning fork organised as set forth above, or electrically maintained in any other manner, to actuate a second tuning fork or a reed arranged to have a natural period much longer than that of the tuning fork. The end of the reed, or the end of one limb of the secondary tuning fork is in light contact with the side surface of one arm of the main tuning fork. In this case, vibration of the main tuning fork causes the slower fork or reed to bounce away, and if the relative frequencies are suitable, bouncing will continue and give a movement of considerably higher amplitude than that of the main tuning fork. The signal circuit may be controlled directly or through a relay by the contact between the secondary tuning fork and the main tuning fork, or between the secondary tuning fork and a resilient contact against which the secondary fork may be bounced by the vibration of the main tuning fork.

The invention also provides means for indicating the fundamental note of a sound such as that produced by the voice by utilising tuning forks or other mechanical vibrators such as tuned diaphragms and control systems arranged as already described. A series of such tuned bodies are arranged in order, from that tuned to the lowest frequency to that tuned to the highest frequency. Voice currents obtained from the sound to be analysed and usually suitably amplified, are supplied to the actuating coils of the tuning forks, and then the contacts controlled by the fork may control directly, or through relays, the circuits of distinctive signals Such an instrument may usefully be employed as an aid in teaching deaf children or other persons to speak, since, although they cannot hear the pitch of the sounds that are given out, they may be taught to realise that when a particular signal appears they are emitting a sound of a certain desired pitch. In this way the instrument may be employed to correct the pitch of the voice of a deaf child, either by raising or lowering it, and the instrument may also be employed to illustrate to a deaf child or person the proper inflection to be used on speaking. The instrument is not limited in its use to training the deaf to speak, but it is also useful in training the voice of persons having normal hearing, and is especially useful in training the voices of singers.

In many cases, it is convenient to allow only the fundamental note to operate a signal, but no higher harmonics or indeed any higher notes at all. This may be effected by arranging that if one of the tuning forks operates, it cuts off the tuning forks of higher pitch from effectively operating. For example, if a tuning fork operates, it releases the contact of the relay associated with it, and while closing the circuit of the distinctive signal it also opens the circuit of all the succeeding distinctive signals associated with the tuning forks of higher pitch. Furthermore, by duplicating the relays or their contact members, it may be arranged that not only are the circuits of the subsequent distinctive signals interrupted, but also the circuits of the actuating windings of the tuning forks of higher pitch.

Instead of employing relays, the tuning forks may themselves operate contacts directly so that each tuning fork, when set into vibration, not only completes the circuit of its own distinctive signal, but it directly interrupts the circuit of the signals of all subsequent tuning forks.

In some instances, as in teaching deaf children, difficulty may be caused if an adult male teacher is trying to demonstrate expression on a voice pitch indicator such as described above, because the children have voices normally pitched an octave higher than the teacher's voice, and therefore, the teacher's voice may operate signals lower down the scale than those he wishes the children to actuate. This may be dealt with in several ways, but one example consists in connecting the relay controlling a given distinctive signal through a two-way switch to two tuning forks an octave apart. In this way, the teacher may throw the switch to connect in the lower tuning fork when he is demonstrating with his own voice, but may shift over the switch to connect to the higher tuning fork when the children are attempting to reproduce the sound.

Various embodiments of the present invention are illustrated in the annexed drawings, in which:—

Figure 1 is a side elevation of a tuning fork arranged in accordance with the present invention with its circuit connections shown diagrammatically;

Figure 2 is a detailed view of a slight modification;

Figure 3 is a view similar to Figure 1 of another arrangement in accordance with the invention;

Figure 4 is a similar view to Figures 1 and 3 of yet another arrangement;

Figure 5 is an end elevation of Figure 4;

Figure 6 is an elevation partly in section of a detail of the construction shown in Figure 4;

Figures 7, 8, 9 and 10 are diagrams showing methods of operating resiliently mounted contacts by means of a tuning fork;

Figures 1 to 6 show arrangements of tuning forks the magnetic circuit of which is self-contained, that is to say, it is contained within the fork itself and the pole pieces, and there is no magnetic member external to the fork through which the operating flux has to pass.

Figure 11:
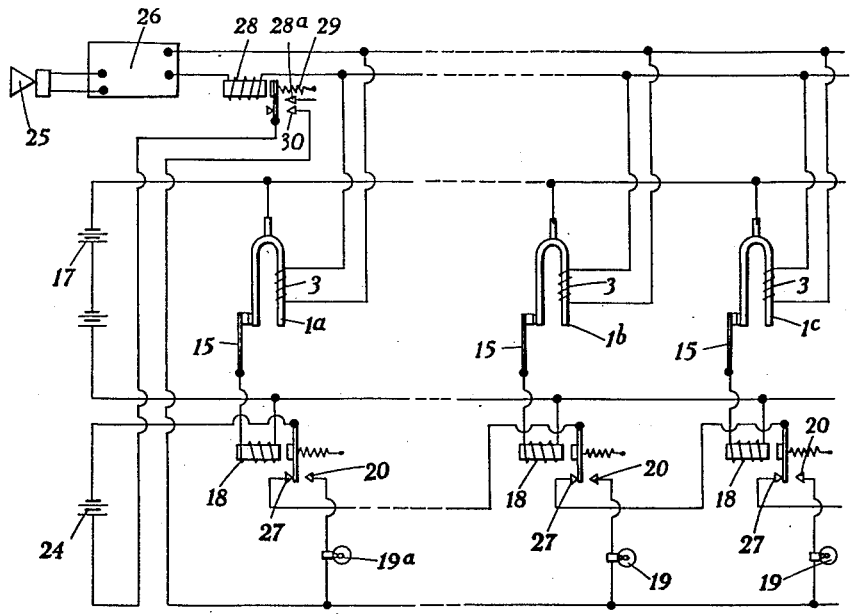
Figure 11 is a circuit diagram of an arrangement for indicating the pitch of the fundamental note of a complex sound by means of tuning forks.

In Figures 1 to 3, the fork may be assumed to be a mild steel fork shown at 1, provided with a winding 3 in which a pulsating or alternating current flows. In Figure 1, it is arranged that the circuit of the coil 3 is interrupted in step with the vibrations of the tuning fork, but since the circuit from the battery 4 through the winding 3 passes through a fixed contact 5 and the contact 6 carried by the tuning fork, current passes through the winding 3 when the fork is at rest and increases the magnetism of the fork to draw the contact 6 away from the contact 5. The contact 6 returns, however, when, as a result of the separation of the contacts, the circuit of the winding 3 is interrupted, and in this way, continuous vibration of the tuning fork 1 is maintained.

As regards the shape of the pole pieces, each pole piece 7 has a short part 8 and a long part 9 arranged so that the short part 8 of one pole piece is opposite the long part 9 of the other pole piece, with the result that during vibration, the two parts may overlap without unduly varying the air gap between them. In Figure 1, both the polarising coil 2 and the flux-varying coil 3 are mounted directly on the tuning fork limbs so as to vibrate with it.

In Figure 2, there is a slight modification in that the pole pieces 7 instead of being secured to the tuning fork 1 by set screws 10, are located by means of nuts 11 threaded on to extensions of the limbs of the tuning fork.

In Figure 3, the arrangement is generally similar to that shown in Figure 1, and there are only three main differences. One is that polarising coils 2 are provided supplied from the battery 4 and the coils 2 and 3 embrace the limbs of the tuning fork 1, but are carried on fixed supports so that there is clearance between them and the limbs so that the tuning fork can vibrate independently of the coils. These coils 3 are also shown connected to terminals 3a which may be supplied from the output circuit of a thermionic amplifier. In this case, the short part of the lower pole piece 7, seen at 8, is centrally placed, whereas the long part 9 of the upper pole piece 7a is also centrally placed, and sandwiches between the longer parts of the lower pole piece 7.

In Figures 4 and 5, the pole pieces 7 have respectively a central short part 8 and a central long part 9 engaging with the said short part, but the pole pieces have the shape as seen in end view in Figure 5, and not as seen in side view in Figure 3. Moreover, in Figure 4, the tuning fork is a composite member, the rear part 12 being a permanent horse-shoe magnet, designed to provide the polarising field without any polarising winding. This magnet has forward extensions really consisting of pole pieces 13 of mild steel or soft iron, to which the pole pieces proper 7 are secured by screws 10. The coil 3, which may receive alternating or pulsating current, is located around the extensions 13 and has the action of varying the fields set up by the permanent magnet 12 at the frequency of the tuning fork 1.

Figure 6 shows how the soft iron extensions 13 may have screw-threaded shanks 14 enabling them to be screwed into the permanent magnet limbs 12.

In the above examples, the fork is shown maintaining itself in vibration and providing the fluctuating current in the coils 3 by interruption of the contacts 5 and 6. In some subsequent examples, it will be shown how the fork may be actuated by amplified voice currents. Various other methods may be used for driving the fork, and in fact the supply may be either a direct or alternating current supply. When direct current is used, if its fluctuation is not controlled directly by the fork itself, it must be caused to fluctuate at a frequency equal to the natural frequency of the fork or at a lower frequency which is a fraction of the natural frequency. It may regularly fluctuate in intensity, or a sequence of regular impulses of constant amplitude may be applied to the winding. Again, a microphone may be placed near the fork to be actuated by the mechanical vibrations it receives, its electrical output being applied to an amplifier, the output of which is again passed to the actuating winding of the fork.

Another arrangement consists in arranging coils in the grid and anode circuits of an electron discharge tube, to embrace the two arms of the tuning fork so that the latter couples the windings together to enable the tube to generate continuous oscillations, the frequency of which is tuned to the natural frequency of the fork.

Figures 7 to 10 are diagrams showing how the tuning fork, which may be constructed as shown in Figures 1 to 6, can be arranged for the control of signalling circuits. The tuning fork 1 is arranged to actuate a secondary tuning fork or reed 15 which is weighted to have a much longer natural period than that of the tuning fork 1.

In Figure 7, the free end of the reed 15 is in light contact with the side surface of one of the limbs of the tuning fork 1, while at its other end, the reed 15 is held in a clamp 16. It is found that when the tuning fork 1 is set into vibration, for example, by passing an alternating current of the frequency of the tuning fork 1 into the winding 3 shown in Figures 1 to 6, the slower reed 15 is caused to bounce away, and by suitable choice of the relative frequencies the bouncing continues and gives a movement of considerably larger amplitude than that of the tuning fork 1. A contact between the tuning fork 1 and the reed 15 is shown included in the circuit of a battery 17 and a relay winding 18. When the tuning fork 1 is set into vibration, the relay 18 is allowed to release its armature and close the circuit of a lamp, flag, or shutter 19 at the contact 20.

In Figure 8, the reed 15 is replaced by a tuning fork 15, also of a longer natural period than that of the main tuning fork 1.

In Figure 9, the secondary tuning fork 15 is of such proportions that both its arms are in contact with the side surfaces of both arms of the primary tuning fork 1. In this case, in order to provide adjustment of the contacts, adjustable contact screws 21 are provided. The contacts between the tuning forks 1 and 15 are arranged in parallel in the circuit of the relay 18 in Figure 9.

In Figure 10, the circuit of the signal device 19 does not include the contact between the main tuning fork 1 and the reed 15, but the latter is caused to bounce into contact with a spring contact 22 which is prevented from following the reed 15 right back to the fork 1 on the return swing by a suitable adjustable stop 23. In this case, there is no relay, but the contact between the reed 15 and the spring 22 is directly in the circuit of the lamp 19 and its battery 24.

Tuning forks and control systems as shown in the preceding figures are applied in Figure 11 to indicate the fundamental note of a sound such as the voice. A series of tuning forks 1a, 1b, 1c, etc., which may be maintained as in the preceding figures, are arranged in order from the fork 1a tuned to the lowest frequency to that tuned to the highest frequency. These are subjected to the sound to be tested by causing the sound to act upon a microphone 25, the current of which is amplified by an amplifier 26, the output of which is supplied to the operating coils 3 of the tuning forks 1a, 1b, 1c, connected in parallel. The forks which are set into vibration will control the circuit of distinctive signals. For this purpose, each of the tuning forks is associated with a reed 15 arranged for example as shown in Figure 7 to provide a bouncing contact, the relay battery 17 in this case being common to the windings 18 of all the relays. The lamps or other signal devices 19 are supplied from a battery 24, and the circuit of the first lamp 19a is exactly as illustrated in Figures 7 to 9. In this arrangement, when a given tuning fork is not vibrating, its relay 18 is energized, but when a given tuning fork responds to the sound and interrupts its contact, its relay 18 releases its armature on to its back contact 20, thus completing the circuit of the corresponding signal device 19. Thus, when a sound is given out, the signal devices which are displayed indicate which tuning forks are vibrating and which components of the sound are present.

As illustrated, however, the circuit is arranged to allow only the fundamental note or the lowest of the notes forming a complex sound to operate the corresponding signal by reason of the fact that if one of the tuning forks vibrates and closes its signal circuit, it opens at its front contact 27 the lamp circuits of all succeeding tuning forks. It is obvious that any desired number of tuning forks may be interposed as shown by the dotted lines between the tuning forks 1a and 1b.

It is found in practice that sometimes a harmonic of a sound causes a tuning fork to vibrate so strongly that when the fork energized by the fundamental note has ceased vibrating, the fork of the harmonic continues for a short period. When the fundamental fork ceases to vibrate, its relay draws back its contact and the elimination of harmonics is temporarily suspended so that a momentary signal may be given from a harmonic tuning fork which may be confusing, especially when the instrument is used for instructing a deaf person. To avoid this, a master relay 28 is shown which attracts its armature when no sound is affecting the apparatus, and constant direct current is supplied from the amplifier 26. If this constant current is varied or alternating current is superimposed on it by the action of the voice on the microphone 25, the relay 28 releases its armature since its spring 29 is of lower frequency than the voice, and closes the back contact 30, in the circuit of the lamps 19. In this way, when the voice ceases, the contact 30 is broken and then none of the forks is able to display its signal 19.

Figure 12:
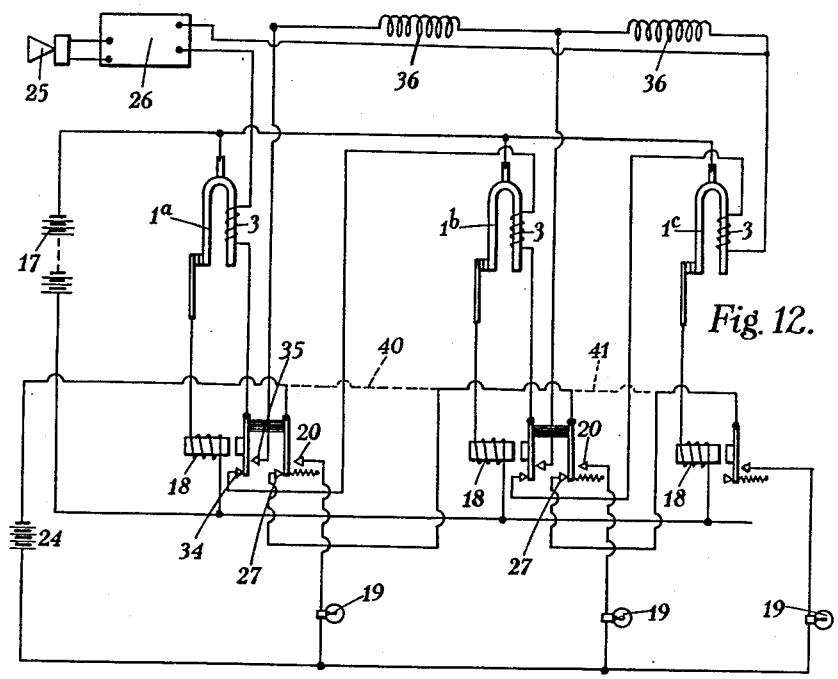
Figure 12 shows a system similar to Figure 11 but with a modified arrangement of the relay contacts.

In Figure 12, an arrangement similar to that in Figure 11 is shown and similar reference numerals are employed. The only difference here is that each relay 18 except the last has two moving contact members insulated from one another. One contact member closes its own lamp contact 20, when de-energized by its tuning fork vibrating, and opens its contact 27 to cut off the lamp circuit of all subsequent tuning forks. Its other moving contact member is arranged to interrupt the circuits of the magnet coils of all higher note forks. Thus, if the fork 1a is not vibrating, its relay 18 makes contact with its front contact 34, and since the tuning fork coils 3 are in series, the circuit through all of them is completed. If, however, the tuning fork 1a vibrates, its second member leaves the front contact member 34, interrupting the magnet contacts of the subsequent forks, but it rests against its back contact 35 and connects its own coil 3 directly across the amplifier output. Impedances 36 are arranged in the return to the amplifier so that the total impedance is always constant. If the arrangement is modified by dispensing with the contacts 27 and the connections thereto, the circuit from the battery 24 then takes the direct course shown by the dotted line connections 40, 41 and the signals 19 responding to the higher frequencies are only controlled by the contacts 34 which are located in the energising circuits of the tuning forks 1a, 1b, 1c.

In some instances, it may be desirable to prevent the forks vibrating after the sound from the voice ceases. This may be effected by employing the master relay 28 (Figure 11) to control the circuit of electromagnets for controlling the application of damping pads to each of the tuning forks 1a, 1b, 1c. The damping pads could be applied to the tuning forks by springs and retracted by the said electromagnets when same are energised. When the voice currents commence the relay 28 releases its armature and the auxiliary contact 28a may be arranged to close the circuit of the said electromagnets which control the application of the damping pads to the tuning forks.

It may also be arranged that each of the tuning forks when it vibrates also interrupts the circuit of the said electromagnets, in which event, the master relay 28 would close the contact 28a upon commencement of the voice currents but the lowest frequency tuning fork vibrating would over-ride the circuit-closing effect of the master relay 28. With such an arrangement, fewer tuning forks with their frequencies more widely spaced apart and with lightly set bouncing contacts 15 may be used so that each will respond to a fairly wide variation of voice frequency above and below the true note of the tuning fork. Such an arrangement would otherwise necessitate an unduly long time period between changes of pitch when the instrument is used as a voice pitch indicator but the use of damping pads avoids this.

Figure 13:
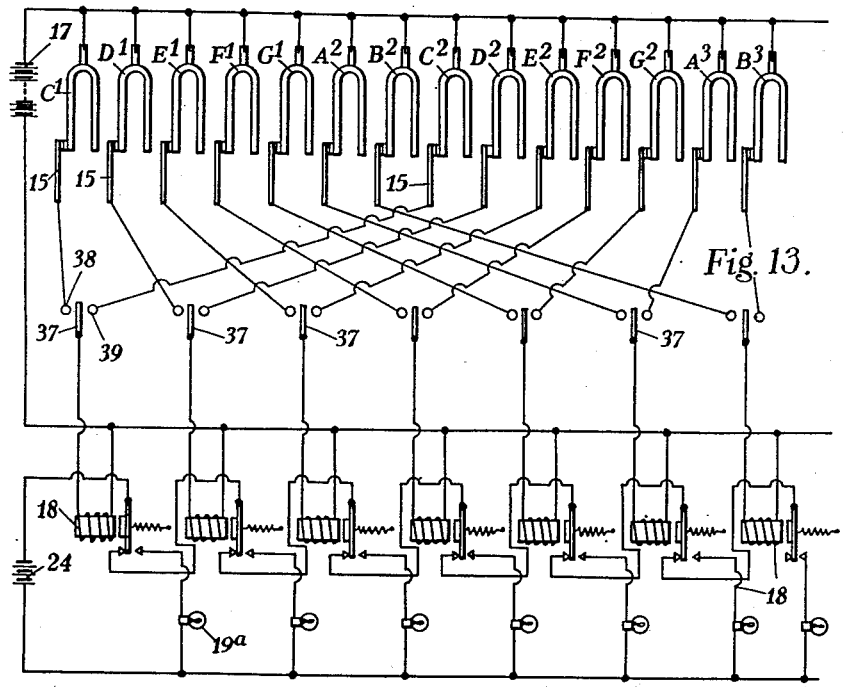
Figure 13 shows a modification of the diagram shown in Figure 11 but arranged for the same indicator to be actuated by notes of different pitch.

In some instances, as in teaching deaf children, difficulty may be caused if an adult male teacher is demonstrating expression on a voice pitch indicator, since his own voice may operate signals lower down the scale than those he wishes the children to actuate because their voices are normally pitched an octive higher than his. Figure 13 shows an arrangement for overcoming this. Generally speaking, it shows an arrangement similar to that of Figure 11, the microphone, amplifier and magnet coils not being shown. However, each of the relay windings 18 is connected to a pair of the bouncing contacts 15 through a number of two-way switches 37. It will be noticed, for example, that one switch 37 is connected to the bouncing contact 15 of a tuning fork C1, and also to the bouncing contact 15 of another tuning fork C2 which is an octave higher than the tuning fork C1. Thus, when the instructor is demonstrating the apparatus, this switch may be placed on its contact 38 so that the instructor can make the tuning fork C1 vibrate and consequently illuminate the lamp 19. When the children are attempting to produce the same effect, the switch 37 may be placed on to its other contact 39, and then if the children succeed in making the tuning fork C2 vibrate, they will cause the same lamp 19 to light up. Each relay winding 18 can similarly be connected to one or other of the tuning forks an octave apart by placing the corresponding switch 37 on the appropriate contact.

A similar result may be obtained by other methods. For example, it may be arranged that two tuning forks an octave part, such as the forks C1, C2, may control a pair of lamps or other signals which are placed close together side by side. Moreover, where the range in each voice does not exceed an octave, various arrangements for coupling forks an octave apart to a single lamp may be used. For example, the relays 18 associated with the tuning forks C1, C2 may have their contacts connected in series with the same lamp, and similarly with other tuning forks an octave apart. Yet again, suitable electric filters may be employed in the circuit of the microphone 25, or in one of the stages of the amplifier 26 to filter out the fundamental note of the adult male voice so that the first harmonic of that voice will operate the same fork as the children's voices.

It has already been indicated that tuned bodies other than tuning forks may be used in systems for eliminating the effects of the higher frequencies as illustrated in Figures 11 to 13. Again, instead of the tuning forks, the instrument may be provided with tuned electrical circuits which when they respond to the voice currents, cause the actuation of mechanical triggers or relays associated with the circuits responsive to the different frequencies.

It is clear that in practice, in systems of which examples are illustrated in Figures 11 to 13, all the tuning forks should have sufficient energy supplied to them so that when the frequency of the energising current is somewhat off that of the tuning fork, the latter will be energised in order that there may be no gaps in the frequency spectrum at which none of the tuning forks is set into vibration. A tuning fork is not very tolerant but the tendency of the voice to "wobble" somewhat in pitch makes the use of tuning forks possible.

The matter of the intervals between the frequencies of successive tuning forks is of some importance in practice. The best arrangement for training the deaf consists in using two semitone intervals, in other words, six to the octave.

I claim:—

1. An electrically-maintained mechanical vibrator, comprising an elastic vibratory member of magnetic metal and shaped with one of its free ends located in proximity to the other free end to provide magnetic attraction directly between said free ends and of sufficient magnitude to vibrate said ends, an energising winding linked with said member and a source of intermittent current connected to feed said energising winding.

2. An electrically-maintained mechanical vibrator, comprising an elastic vibratory member of magnetic metal and having substantially a U-shaped configuration, a pair of overlapping pole pieces each secured to one of the free ends of said vibrating member to vibrate therewith, an energising winding embracing one limb of said vibrating member and a source of intermittent current connected to feed said energising winding.

3. An electrically-maintained mechanical vibrator, comprising an elastic vibratory member of magnetic metal and shaped with one of its free ends located in proximity to the other free end to provide magnetic attraction directly between said free ends and of sufficient magnitude to vibrate said ends, an energising winding linked with said member, a fixed electrical contact, a second contact mounted on said vibratory member to vibrate therewith and thereby co-operate with said fixed contact and a source of direct current connected to said energising winding and said co-operating contacts in series.

4. An electrically-maintained mechanical vibrator, comprising an elastic vibratory member of magnetic metal and having substantially a U-shaped configuration, a fork-shaped pole piece secured to one free end of said vibrating member to vibrate therewith, a blade-shaped pole piece secured to the other free end of said vibrating member and interleaving with said fork-shaped pole piece, an energising winding embracing one limb of said vibrating member and a source of intermittent current connected to feed said energising winding.

5. An electrically-maintained mechanical vibrator comprising an elastic vibratory member of mild steel and shaped with one of its free ends located in proximity to the other free end to provide magnetic attraction directly between said free ends and of sufficient magnitude to vibrate said ends, a polarising winding linked with said member, a source of steady current connected to feed said polarising winding, an energising winding also linked with said member and a source of intermittent current connected to feed said energising winding.

6. An apparatus for indicating the presence of certain frequencies in a complex sound, comprising a plurality of mechanical circuit-controlling members selectively responsive to electric currents of different frequencies in an ascending series, circuit means for supplying to said members fluctuating controlling currents corresponding in frequencies to those of the complex sound, a source of electrical supply, a plurality of relays each having a winding in circuit with one of said circuit-controlling members and said source of supply and circuit connections interconnecting the contacts of said relays whereby the responding of one of said circuit-controlling members effects the interruption of the circuits controlled by the contacts of all the relays associated with said circuit-controlling members responsive to frequencies higher than that of the said one circuit controlling member.

7. An apparatus for indicating the presence of certain frequencies in a complex sound, comprising a plurality of mechanical vibrators tuned to vibrate at different frequencies in an ascending series, a plurality of energising windings each linked with one of said vibrators, circuit means for supplying to said windings fluctuating currents corresponding in frequencies to those of the complex sound, a plurality of circuit-controlling contacts each associated with and responsive to the vibration of one of said vibrators, a source of electrical supply, a plurality of relays each having its winding in circuit with one of said contacts and said source of supply and circuit connections interconnecting the contacts of said relays whereby the responding of one of said vibrators effects the interruption of the circuits controlled by the contacts of all the relays associated with said vibrators of frequencies higher than that of the said one vibrator.

8. An apparatus for indicating the presence of certain frequencies in a complex sound, comprising a plurality of mechanical vibrators tuned to vibrate at different frequencies in an ascending series, a plurality of energising windings each linked with one of said vibrators, circuit means for supplying to said windings fluctuating currents corresponding in frequencies to those of the complex sound, a plurality of circuit-controlling contacts each associated with, and responsive to the vibration of one of said vibrators, a source of electrical supply, and a plurality of electrically-actuated signal devices connected to respond respectively to the actuation of said circuit-controlling contacts, a plurality of further circuit-controlling contacts also each associated with and responsive to the vibration of one of said vibrators, and circuit connections interconnecting said last-mentioned contacts whereby the responding of one of said vibrators effects the interruption of the circuits controlled by the contacts associated with certain of the other vibrators.

9. An apparatus for indicating the presence of certain frequencies in a complex sound, comprising a plurality of mechanical vibrators tuned to vibrate at different frequencies in an ascending series, a plurality of energising windings each linked with one of said vibrators, a thermionic amplifier having its output connected to said energising windings, a microphone connected to the input of said amplifier, a plurality of circuit-controlling contacts each associated with, and responsive to the vibration of one of said vibrators, a source of electrical supply, a plurality of electrical signals connected in circuit so as to be respectively responsive to the actuation of said circuit-controlling contacts, and a master relay in the output circuit of said amplifier so as to be energised when there is no sound input to said microphone, and thereby interrupting a contact of said relay in the circuit of said electrical signalling devices.

10. An apparatus for indicating the presence of certain frequencies in a complex sound, comprising a plurality of mechanical vibrators tuned to vibrate at different frequencies in an ascending series, a plurality of energising windings each linked with one of said vibrators, circuit means for supplying to said windings fluctuating currents corresponding in frequencies to those of the complex sound, a plurality of circuit-controlling contacts each associated with, and responsive to the vibration of, one of said vibrators, a plurality of electrical signalling devices in circuit so as to be controlled by said circuit-controlling contacts, a plurality of further circuit-controlling contacts each associated with, and responsive to the vibration of, one of said vibrators and each in circuit with the vibrator of next higher frequency in order to interrupt the circuit of said vibrator of next higher frequency upon the vibration of the vibrator associated respectively with each of said further contacts.

11. An apparatus for indicating the presence of certain frequencies in a complex sound, comprising a plurality of mechanical vibrators tuned to vibrate at different frequencies in an ascending series, a plurality of energising windings each linked with one of said vibrators, circuit means for supplying to said windings fluctuating currents corresponding in frequencies to those of the complex sound, a plurality of circuit-controlling contacts each associated with one of said vibrators to be open-circuited thereby upon vibration thereof, a source of electrical supply, a plurality of relays each having a winding in circuit with one of said contacts and said source of supply, and having a pair of separate moving contacts in circuit respectively with the energising windings of the vibrator next higher in frequency and in circuit with the second moving contact of the vibrator next higher in frequency, and a plurality of electrical signalling devices respectively connected in circuit to be controlled by the second moving contact of one of said relays.

12. An apparatus for indicating the presence of certain frequencies in a complex sound, comprising a plurality of mechanical vibrators tuned to vibrate at different frequencies in an ascending series, a plurality of energising windings each linked with one of said vibrators, a thermionic amplifier having its output connected to said energising windings, a microphone connected to the input of said amplifier, a plurality of circuit-controlling contacts each associated with, and responsive to the vibration of, one of said vibrators, a source of electrical supply, a plurality of electrical signals connected in circuit so as to be respectively responsive to the actuation of said circuit-controlling contacts, a master relay in the output circuit of said amplifier so as to be energised when there is no sound input to said microphone, and damping means associated with at least one of said mechanical vibrators and rendered operative under the control of the contacts of said master relay.

13. An apparatus for indicating the presence of certain frequencies in a complex sound, comprising a plurality of mechanical vibrators tuned to vibrate at different frequencies in an ascending series, a plurality of energising windings each linked with one of said vibrators, a thermionic amplifier having its output connected to said energising windings, a microphone connected to the input of said amplifier, a plurality of circuit-controlling contacts each associated with, and responsive to the vibration of, one of said vibrators, a source of electrical supply, a plurality of electrical signals connected in circuit so as to be respectively responsive to the actuation of said circuit-controlling contacts, a master relay in the output circuit of said amplifier so as to be energised when there is no sound input to said microphone, a plurality of further circuit-controlling contacts each associated with, and responsive to the vibration of, one of said vibrators and damping means associated with at least one of said mechanical vibrators and rendered operative under the control of the contacts of said master relay and under the control of said further circuit-controlling contacts.

14. An apparatus for indicating the presence of certain frequencies in a complex sound, comprising a plurality of mechanical vibrators tuned to vibrate at different frequencies in an ascending series, a plurality of energising windings each linked with one of said vibrators, circuit means for supplying to said windings fluctuating currents corresponding in frequencies to those of the complex sound, a plurality of circuit-controlling contacts each associated with and responsive to the vibration of one of said vibrators, a source of electrical supply, a plurality of relays each having its winding in circuit with said source of supply, a plurality of two-way switches, circuit connections connecting each of said switches to the winding of one of said relays and to the circuit-controlling contacts associated with two of said vibrators and further circuit connections interconnecting the contacts of said relays whereby the responding of one of said vibrators effects the interruption of the circuits controlled by the contacts of all the relays associated with said vibrators of frequencies higher than that of the said one vibrator.

15. In apparatus for indicating the pitch of the fundamental tone in a complex sound, the combination of means for producing a complex electric current corresponding to said complex sound, a plurality of current responsive devices connected in circuit with said complex current and being tuned to respond to currents of different frequencies in an ascending series, a corresponding plurality of signal devices controlled respectively by said plurality of tuned devices, and means responsive to the operation of any of said tuned devices for preventing the operation of all tuned devices having a higher position in said series.

16. In apparatus for indicating the pitch of the fundamental tone in a complex sound, the combination of means for producing a complex electric current corresponding to said complex sound, a plurality of current responsive devices connected in circuit with said complex current and being tuned to respond to currents of different frequencies in an ascending series, a corresponding plurality of signal devices controlled respectively by said plurality of tuned devices, and means responsive to the operation of any of said tuned devices for preventing the operation of all signal devices associated with tuned devices having a higher position in said series.

17. In apparatus for indicating the pitch of the fundamental tone in a complex sound, the combination of means for producing a complex electric current corresponding to said complex sound, a plurality of current responsive devices connected in circuit with said complex current and being tuned to respond to currents of different frequencies in an ascending series, a corresponding plurality of signal devices controlled respectively by said plurality of tuned devices, switching means controlled by each of said tuned devices and rendered operative upon energization of any of said tuned devices for disconnecting from said complex current all tuned devices having a higher position in said series and switching means controlled by each tuned device and rendered operative upon energization of any tuned device for opening the energizing circuit of all signal devices associated with tuned devices having a higher position in said series.

ALBERT EDWARD COYNE.